Nov. 9, 1965  F. W. COOLEY ETAL  3,216,696
LUBRICATED BALL PLUG VALVE WITH RELIEVED SURFACE ON SEAT RING
Filed July 20, 1961  6 Sheets-Sheet 1

INVENTORS
Farris W. Cooley
Harold W. Willis

BY *Strauch, Nolan & Neale*

ATTORNEYS

Nov. 9, 1965  F. W. COOLEY ETAL  3,216,696
LUBRICATED BALL PLUG VALVE WITH RELIEVED SURFACE ON SEAT RING
Filed July 20, 1961  6 Sheets-Sheet 3

Fig. 4

INVENTOR
Farris W. Cooley
Harold W. Willis

BY
ATTORNEYS

Fig. 8

INVENTORS
Farris W. Cooley
Harold W. Willis of ball type valves for use in large, high pressure fluid pipelines up to 30 inches and more in diameter and is particularly directed to lubricated ball valves and improvements in construction of the spherical seating surfaces of ball plug seat rings.

United States Patent Office 3,216,696
Patented Nov. 9, 1965

3,216,696
LUBRICATED BALL PLUG VALVE WITH RELIEVED SURFACE ON SEAT RING
Farris W. Cooley and Harold W. Willis, Atchison, Kans., assignors to Rockwell Manufacturing Company, Pittsburgh, Pa., a corporation of Pennsylvania
Filed July 20, 1961, Ser. No. 125,492
9 Claims. (Cl. 251—175)

This invention relates to seating structure of ball type valves for use in large, high pressure fluid pipelines up to 30 inches and more in diameter and is particularly directed to lubricated ball valves and improvements in construction of the spherical seating surfaces of ball plug seat rings.

One successful application of ball plug valve seat rings now in practice and disclosed and claimed in application Serial No. 521,495, filed July 12, 1955 by A. Wolfensperger, is based on the concept that an ideal seat ring for a large lubricated ball valve should be more or less free to "float" a slight amount, both radially and axially, so that the ring may adjust itself to the surface of the spherical valve plug. Other successful lubricated ball valves, e.g., as disclosed in Patent No. 2,788,015 to George F. Scherer, have seat ring and valve structure constructed primarily for axial shift of the seat ring. The self-adjustment enabled by the floating disposition of the seat rings was intended and, it is believed, has allowed the seating pressure between the valve plug and the seat ring to be uniform throughout the extent of the plug to ring seating surface. It was discovered as a result of extensive tests on ball valves with floating seat rings in accord with the above noted inventive developments that a high pressure zone existed near the bore of the seat ring which caused the lubricant to be extruded and wiped away from that area. The area being marked by a bright, shiny, dry surface provides proof that extreme wear is present. This is evidence of uneven seating occurring between the ball and the seat ring, resulting in loss of lubricant, leading to leakage and high plug operation torques.

Several developments have been made in attempting to eliminate the uneven wear between the ball plug and its seating surface on a seat ring, and in connection therewith, tests conclusively show that the ball plug undergoes deformation due to high line pressures when in the valve closed position. These test results lead to the belief that what might be termed an "extrusion" effect or a bulging of the ball occurs where the ball seats on the downstream ring. This bulged plug therefore changes from a spherical to a spheroidal shape, particularly adjacent the downstream seat ring. Such change in shape of the plug has been successfully accommodated by constructions enabling flexures of the seat rings to adapt their spherical seating surface to the changes in the mating spherical surface of the ball. Prior developments have used precisely formed spherical and matched seating surfaces on both balls and rings, producing the surfaces by extensive and expensive lapping of the ball and ring.

The present invention eliminates partially and, in one modification, entirely, the need for matched lapping of the ball and seat ring surfaces, providing in lieu thereof an offset ground spherical ball seat surface in at least the downstream seat ring. The offset spherical surface will slightly depart from a spherical concavity equal to the unpressurized plug spherical surface.

Accordingly, a primary object of this invention resides in the provision of a ball type valve for use in large diameter line services embodying novel structural cooperation at the seating surfaces between the plug and cooperating seat ring to provide balanced and sealed seating forces from the ball through its seat ring to the valve body.

Another object resides in the provision in a lubricated ball type valve of a novel seat ring arrangement in which at least the downstream ring seat seats against the valve body with area-to-area engagement and the engagement of the plug spherical seat surface with the spherical seat surface of at least the downstream ring, when no differential exists across the plug, occurs only at a radially outward substantially circular zone portion of the ring spherical seating surface. In connection with this object, a further object resides in the provision in the offset spherical seating surface so formed on the ring seat of one or more annular lubricant grooves.

Still another object resides in the provision of a novel seat ring in a lubricated ball type valve as in the foregoing object wherein a radially outermost portion of the spherical seating surface of the ring seat is spherical about one center point and the remaining radially innermost spherical seating portion is progressively relieved in a downstream direction by a spherical seating surface of smaller radii which diverges from the direction of curvature of the radially outermost portion.

A still further object resides in providing alternative forms of the spherical relief described in the preceding object, in one of which rings substantially the entire concave seating surface of the ring is relieved with respect to the spherical surface of the ball plug when not under pressure, and in a second of which only the radially inner portion of the concave seating surface is provided with the relieved spherical surface while the outermost concave seating portion is provided with a spherical seating surface having substantially the same radius and center of curvature as that of the plug.

Further novel features and objects of this invention will become apparent from the following detailed description and the appended claims taken in conjunction with the accompanying drawings showing a preferred embodiment thereof, in which:

FIGURE 5 is a somewhat schematic sketch of a grinding machine and rotatable table, the grinder supports having adjustments to provide a compound traverse of the grinding wheel head to accomplish the spherical offset relief in a valve ring seat according to the present invention.

The drawings illustrate a sixteen inch sphere valve embodiment wherein the relative dimensions and various structural reinforcing ribs and members have been designed for use in a specific system. The walls of the spherical plug in this exemplary valve are shown as solid whereas in other valves, such as a thirty inch valve, the walls are hollow with various combinations of internal ribbing and with varying wall thicknesses depending upon the strength and rigidity required in the specific installation.

Wherever the terms "upper," "lower" and other indications of relative positions are used in the specification and claims, reference is being made to the valve as illustrated, with the valve stem at the top, and with a vertical rotational axis for the valve element. It is to be understood that these terms are used merely for convenience of description since it is intended that the valve may be mounted in any position, as required by the connecting conduits and location of the valve installation.

In the drawings, reference number 20 identifies a valve assembly including the present invention. Valve 20 has a two-part valve body or casing 22 enclosing a rotatable ball plug 24 having spherical seating surfaces. Shown in FIGURE 1, casing 22 consists of two portions rigidly fastened together, a major substantially cylindrical portion 26, and a dished end portion designated as tail piece 28. The complete valve body 22 has an internal cavity 29 containing the ball plug 24 and the separable seat rings, to be described.

The larger portion 26 of the valve body has a peripheral, axially directed, generally cylindrical wall 30 with the right-hand end having a mounting flange 32 for the tail piece 28. The internal peripheral surface 38 of valve body part 26 constitutes the major portion of body cavity 29 and is partially cylindrical and partially convergent like the wall 30 with a major diameter slightly greater than that of the spherical plug element 24 to permit insertion of the plug 24 into the cavity. Sufficient clearance is provided between plug 24 and the body wall surface to enable controlled full floating displacement of the plug element. A cylindrical flow passage 40 is provided through end wall 36 of body part 26 and within an extension 39 which has conventional mounting flange 42, both the extension and flange being integral with end wall 36. The upper portion of cylindrical wall 30 includes an integral apertured boss 44 with the aperture 46 being provided with various grooves and shoulders, permitting installation of a valve plug operating stem 48 and bushing devices. Stem 48 is inserted through aperture 46 from within the body cavity prior to assembly of the plug unit 24 and tail piece 28. Specific details of the operating stem are not part of this invention. However, suitable stem details are more fully described in the aforementioned application Serial No. 521,495.

The inner periphery 50 of mounting flange 32 is machined to provide a cylindrical pilot bore for a complementary cylindrical locating shoulder 52 provided on the joining flange 54 of tail piece 28 which is mounted in mating relation with body portion 26 whereby the shoulder 52 rests within pilot bore 50. The two mounting flanges 32 and 54 are fastened together as by screws 58, and suitable shims 59 may be used between the flanges 32 and 54 to provide proper assembly clearance. A sealing O-ring of rubber or the like 60 is compressed in an annular groove 62 provided around the locating shoulder 52. Tail piece 28 includes an integral end extension 64 similar to that on body portion 26, formed with a cylindrical flow passage 66 which in assembly is coaxial with flow passage 40. Extension 64 has a flange 68 similar to flange 42. Flanges 42 and 68 at the open ends of both flow passages 40 and 66 enable connection by conventional means such as by welding.

An annular shouldered recess 74 is provided within the body portion 26 at the junction of the convergent wall 34 and end wall 36 and, in assembly, is substantially coaxial with and the same size as a similar annular shouldered recess 76 in the inner surface of tail piece 28 adjacent its fluid passage 66. The cylindrical shoulders of recesses 74 and 76 have a diametral dimension providing a slight clearance over that of the valve seat rings 78 and 80 which are slidably mounted for limited axial movement therein. The exact radial clearance between the seats and the valve body in the exemplary disclosure is not critical and hence, although machining is preferred, the cylindrical peripheries of recesses 74 and 76 may, if desired, be finally formed during casting of body parts 26 and 28. However, the radial surfaces of recesses 74 and 76 are machined so as to provide the end faces 82 and 84 of recesses 74 and 76 with smooth essentially plane surfaces perpendicular to the axis of flow passages 40 and 66. This will provide a substantially close contact with and full area backing for the valve seat rings 78 and 80.

*Seat rings and ball plug*

Seat rings 78 and 80 are preferably made of high tensile iron but may be made of other suitable metals or non-metals. Each ring has a substantially smooth end face 86 disposed in a radial plane, the end face containing an annular groove 88 for receiving a sealing O-ring 90 of synthetic rubber or other suitable resilient material to effect a deformable fluid tight seal with the respective radial surfaces 82 and 84 of recesses 74 and 76. O-rings 90 are of sufficient diameter relative to the depth of grooves 88 to result in their resilient deformation between the seat rings 78 and 80 and the valve body recesses in the assembly by an amount greater than the total relative axial displacement between the seat rings and the plug and the body. This resilient deformation assures that a resilient biasing force of the upstream O-ring 90 will tend to maintain that ring and the plug in substantial surface abutment when the downstream O-ring 90 is fully deformed or "compressed" and by the plug and downstream seat ring 80 being shifted axially against the seat ring recess 76 due to line pressure. For ordinary temperature ranges, O-rings 90 are preferably fabricated from oil resistant synthetic rubber but where higher temperatures are encountered, rings of "Teflon," "Silastic," or like plastics may be used.

The bores 100 of seat rings 78 and 80 are cylindrical and substantially the same size as flow passages 40 and 66 and, as previously described, will be maintained substantially coaxial with those flow passages, slight coaxial deviation being permitted by slight radial clearance arrangements of the seat rings relative to the valve body. Rings 78 and 80 are provided with annular spherically concave seating surfaces 102 (to be more specifically described hereinafter) for cooperation with the spherically convex seating surface zones of the spherical plug 24, which latter is provided with a cylindrical through port 106 at least as large as the flow passages 40 and 66. The ring bores 100 (FIGURE 1) may be of slightly larger diameter than flow passage 66 and plug port 106 to permit a slight radial displacement of the rings without projecting an edge of the bore 100 into the line of flow of fluid through the port 66. Similarly the ends 107 of the plug through port 106 are of slightly larger diameter than the ring bores 100 to permit slight misalignment between the plug port and ring bores without projecting the plug port lips into the line of flow of fluid. The edges of the flow passages 40 and 66, the ring bores 100 and the plug port 106 are chamfered to further enable smooth flow of fluid in valve open condition.

The plug of this invention is made by using preformed cores during casting to provide a rigid body structure having relatively thin cylindrical flow passage wall 108 and spherical wall 110 to provide the ball seating surfaces. Formed in the exterior upper part of wall section 110 in a heavy transverse portion 112 is a cross groove 114 which extends across the top of the plug in a direction perpendicular to the plane of FIGURE 1 for receiving the tang 116 of the operating stem 48. Tang 116 is loosely received in groove 114 to permit relative movement of the plug when it is moved to its closed position.

The spherical surfaces on the plug coacting with the annlar spherical zone seating surfaces 102 on ring seats 78 and 80 are also machined to provide a surface for sealing and seating cooperation with the ring seat seating surfaces in accordance with the invention, as will be described. Although the actuating stem tang 116 fits with a clearance in groove 114 the plug will still be substantially maintained with through port 106 coaxially aligned with flow passages 40 and 66 when the valve is in open position, since the control coaction between tang 116 and groove 114 is such that only a very minor amount of rotative play is permitted in plug member 24.

Each valve seat ring 78 and 80 has its spherical seating surface 102 provided with an annular lubricant groove 124. Groove 124 of each ring is discontinuous for a short extent separated by portions of the seating surface 102. Plural side by side parallel interconnected grooves, similar to that disclosed in application Serial No. 521,495, can be used in lieu of the single groove.

The plug 24 is provided with a set of short grooves 128 at 90° intervals around the margins of the spherical seating surface. These short grooves are long enough to bridge the discontinuities or lands of the lubricant groove 124 in the ring seat spherical surface in either the valve fully opened or fully closed positions, which positions are 90° apart and determined by suitable coacting stops (not shown) on the stem and valve body. When the lubricant groove 124 is bridged at its discontinuities by short grooves 128, the lubricant grooves and the plastic lubricant contained therein become effectively continuous about the ball on the opposed seating surfaces contacted by the seat rings.

The groove 124 is adapted to receive a fluent plastic material which, in addition to transferring the jacking force between the plug and seats, also seals and lubricates the plug seating surface.

Figure 3:
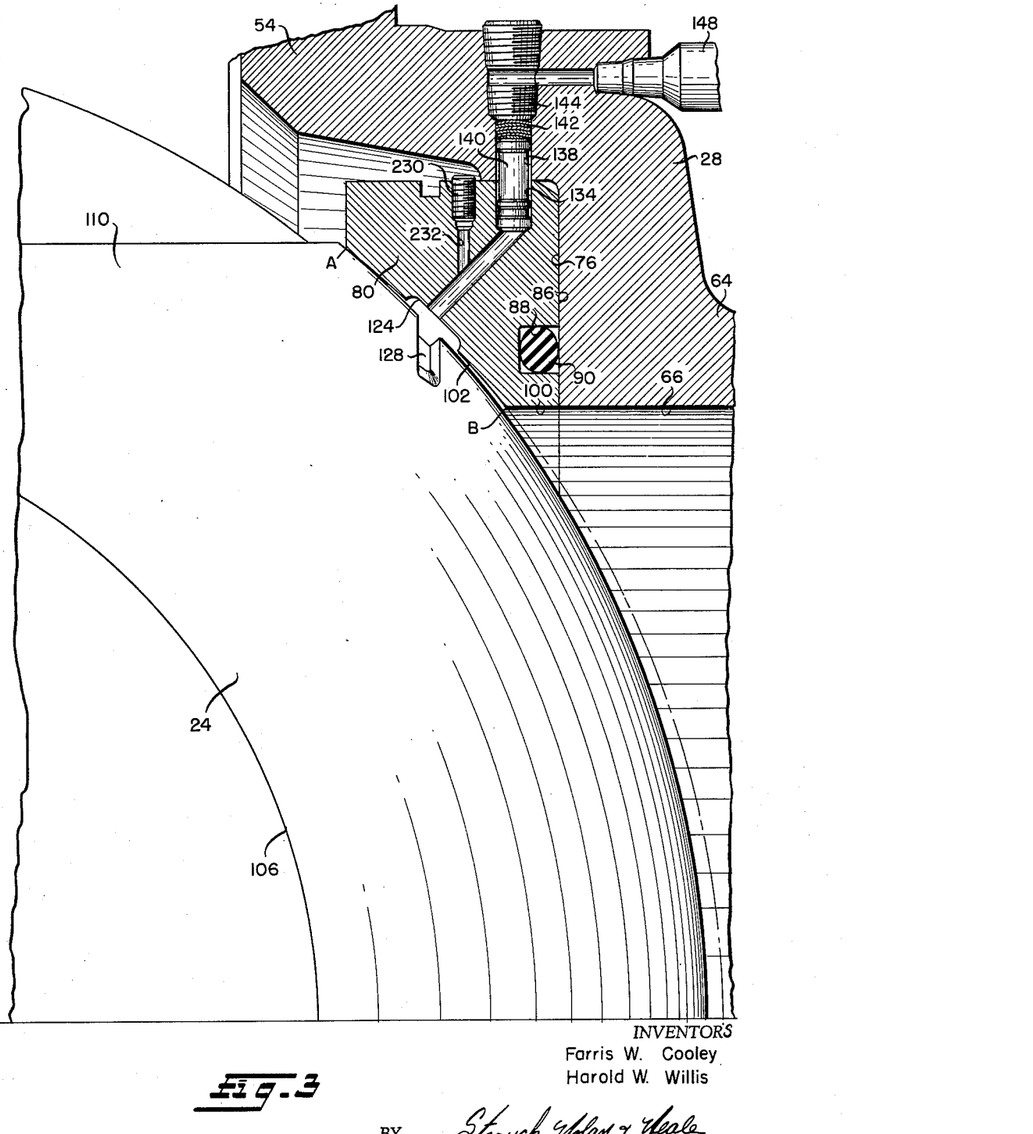
FIGURE 3 is an enlarged detail section view of a portion of the plug, the floating ring seat and the valve body, illustrating a relief clearance (exaggerated) over the entire concave seat surface of the ring seat.

With reference to FIGURE 3, each seat ring 78 and 80 is provided with at least one, and preferably two, substantially radial bores 134, each intersecting a lubricant groove 124. These bores are actually offset from the top of the valve but for ease in illustration are shown at the top. The diameter of ring bore 134 is less than that of body bore 138 to provide ease of alignment between the bores 134 in seat rings 78 and 80 which have axial play relative to the body, as previously mentioned, and the fixed location of the body bores 138 and facilitate insertion of a lubricant conducting bushing 140. This construction serves to permit a universal rocking movement of the special non-flexible lubricant bushing 140, the construction of which is fully described in application Serial No. 521,495.

With bushing 140 properly placed in position to cooperate between the seat rings and valve body in bored passages 134 and 138, three or more compressed Belleville type disc spring washers 142 are positioned on top of each bushing and insure the bushing being fully inserted and retained in its ring bore, yet permitting universal rocking of the bushing. A check valve 144 is threaded into a tapped outer end of the body passage 138 and abuts and retains spring discs 142 against the bushing 140.

Figure 1:
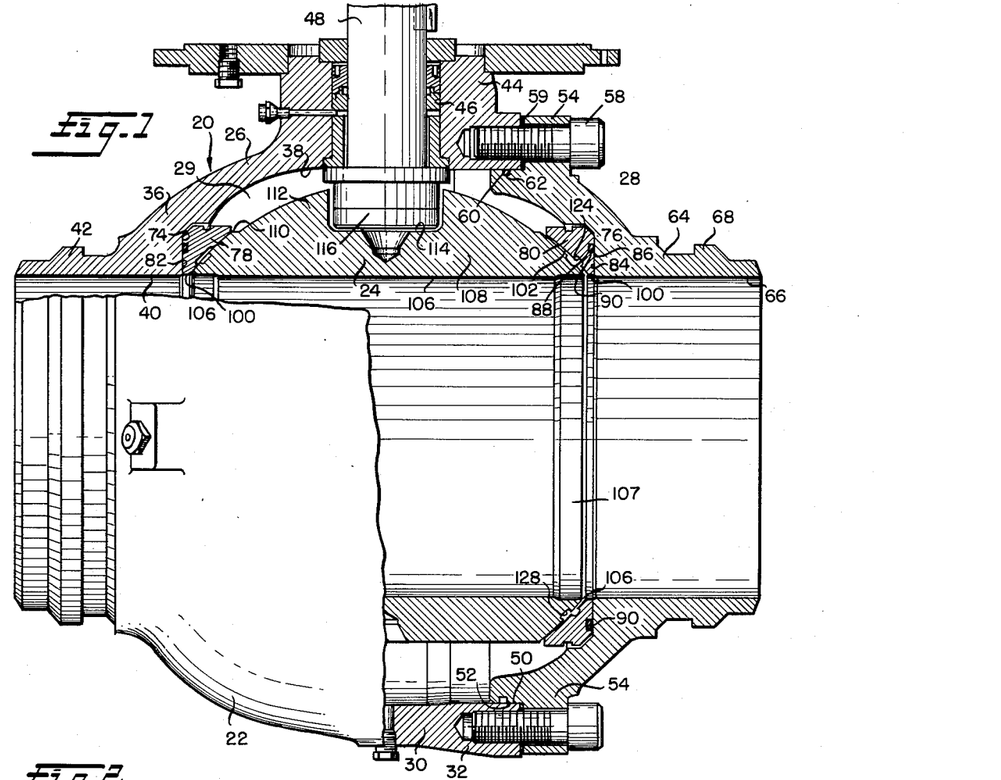
FIGURE 1 is a side elevation partially broken away and in section, illustrating a lubricated spherical zone seating (ball type) valve with at least its downstream spherical ring seat surface relieved according to a preferred embodiment of this invention, the relief being exaggerated for purposes of disclosure.

FIGURE 1 discloses considerable space between the inner peripheral surface of the body casing 22 and the outer surface of the plug 24. This enables passage of line fluid throughout the complete body cavity and completely around the plug between the seat rings. Means for introducing line fluid under pressure from whichever flow passage is upstream may be provided in each of the body portions 26 and 28 but are not a part of the present invention. The details of one form of line fluid by-pass system are fully described in the application Serial No. 521,495.

Figure 4:
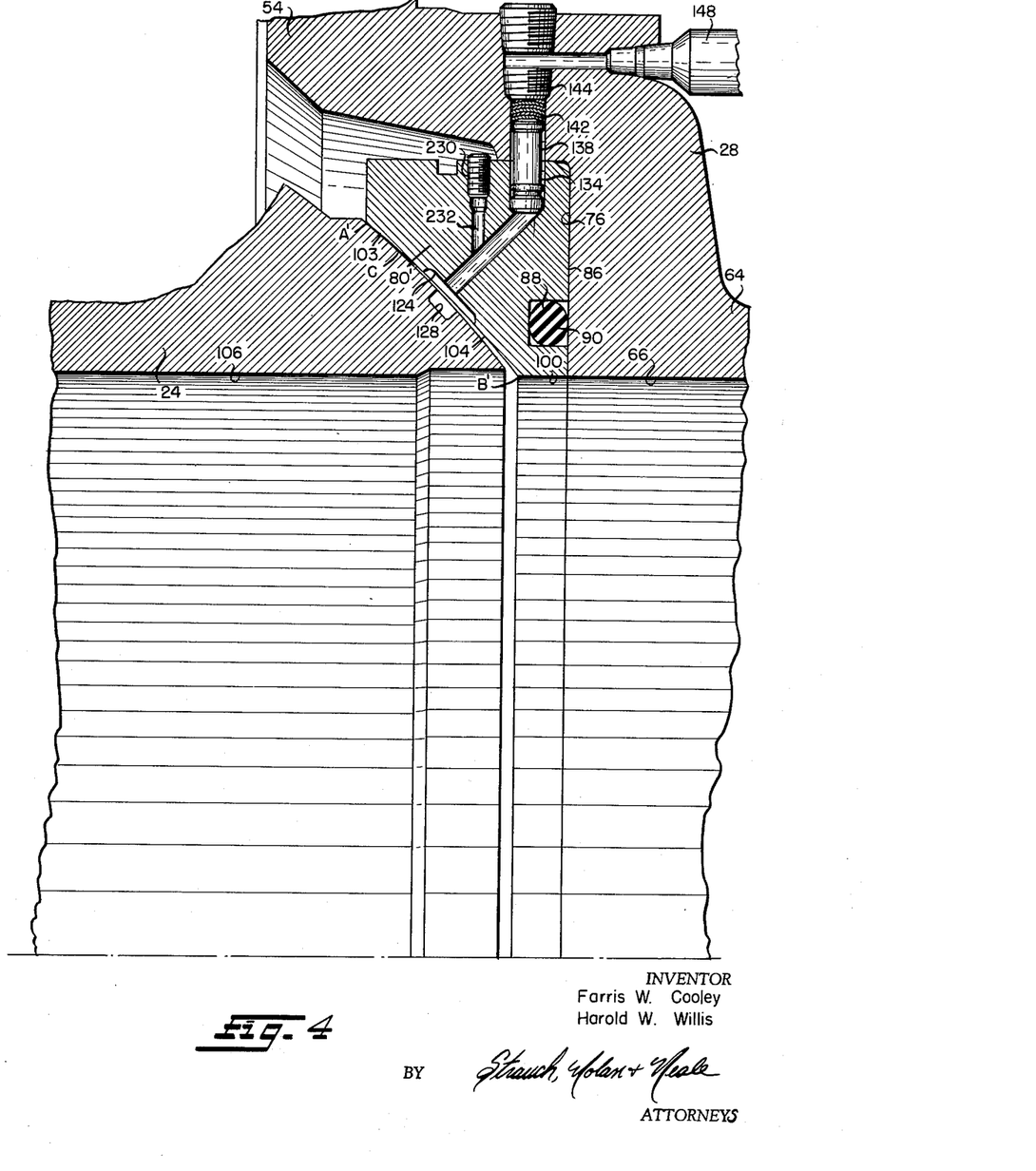
FIGURE 4 is an enlarged details section view similar to FIGURE 3 but illustrating a modified seat ring in which the outer portion of the concave seat surface of the ring is a spherical surface with substantially the same radius and center of curvature as the spherical plug and the inner portion is ground with a relief (exaggerated) consisting of a spherical surface having a slightly smaller radius and with its center displaced slightly downstream from the center of the plug.

In FIGURES 3 and 4, a check valve 230 is shown in a passageway 232 extending from the outer peripheral surface of ring seat 80 to the groove 124 on the concave spherical seating face of the seat ring. Each of the seat rings 78 and 80 includes one or more of such check valves 230 which are threaded into the tapped counterbored outer end of passageway 232. The check valve 230 construction and cooperating function is fully described in the aforementioned application Serial No. 521,495. The purpose of the check valve 230 is to insure that the lubricant pressure in the valve 20 is always at least equal to line pressure.

*Special seat ring construction*

Excepting for the novel seat ring construction and its specific coaction in the valve, particularly as between the seat ring, the valve body and the ball plug, the aforedescribed specific valve components and their structural and functional inter-relationship are not new with this invention.

Previously used seat rings for the large spherical valves with which this invention is related have had a concave spherical seating surface for engagement with the ball plug spherical seating surface, made with a spherical configuration which matched the undistorted spherical seating surface of the ball. In making such previously known constructions with matching spherical surfaces, the ball convex surface is ground to a specified center and spherical radius from that center and the seat ring concave spherical seat surface is ground to the same specified spherical radius and center. The spherical ball seat surface and the spherical ring seat surface are then placed in engagement and are subjected to a slow, tedious and expensive lapping process to result in matching lapped spherical surfaces.

The crux of this invention resides in deliberate departure from a spherical seating surface of the ring matched to the spherical surface of the plug by providing a relief clearance in the spherically concave surface of a ball valve seat ring so its cooperation with the convex seating surface of the ball, when the valve is not pressurized, will provide a gap (see FIGURES 1, 3 and 4) between the ring concave seat surface and the ball seat surface around the radially innermost part of the annular seating surface. The rear face of the relieved seat ring is shaped to rest firmly with substantially full area contact against the back wall of the ring recess in the valve body. Thereafter, when the ball plug is rotated to closed position (FIGURE 3) under line pressure, sealing is immediately present at the engagement between the outer perimeter of the downstream seat ring annular concave seating surface and the spherical seating surface of the ball. Line pressure on the ball deforms the ball plug from its original spherical configuration to a spheroidal shape and into full seating engagement with the relieved spherical seating surface of the downstream seat ring, as shown by the exaggerated ball outline in FIGURE 2 and the phantom ball outline in FIGURE 3.

Figure 2:
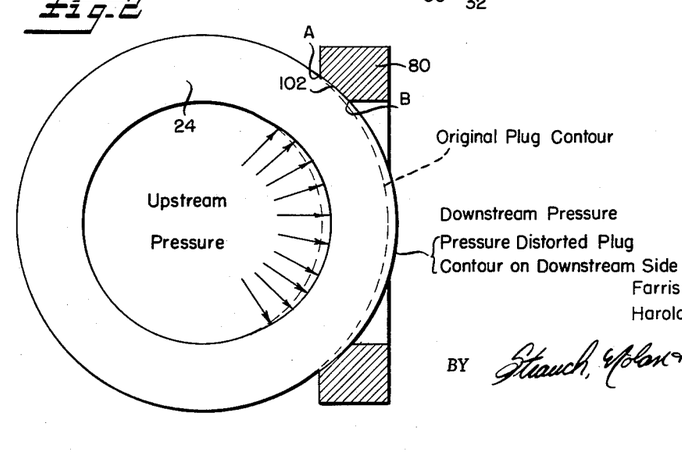
FIGURE 2 is a diagrammatic view illustrating the distortion of the plug when closed and under line pressure, the ballooned distortion being exaggerated for clearer illustration.

Seat ring 80, illustrated in FIGURES 2 and 3, excepting for the outer peripheral circular edge of the concave seating surface, has no part of its spherical concave seating surface 102 formed to match the normal spherical surface of the ball. Theoretically, the outer peripheral circular ring seat edge A (FIGURES 2 and 3) is a circle of such a dimension to engage the ball spherical seating surface at a desired circular zone or area on the ball. If the upstream ring is made in a similar configuration the ball, when not under a differential line pressure, will be supported by the circular ring seat contacts. As a practical matter, these circular contacts are circular areas of contact. From the outer circular edge A to the inner peripheral circular edge B, the concave ring seat surface is formed on smaller spherical radii and provides a progressively greater relief from the normal spherical plug seat surface. The maximum relief at inner edge B is in the order of thousandths of an inch, permitting deformation of the ball into approximately complete seating within the ring seating surface 102, as shown by phantom line in FIGURE 3, without placing any substantially unequal pressures on either the inner or the outer edges of the seat ring concave surface.

Whatever the dimension of the maximum relief, in the seat ring embodiment which has the entire concave seating surface relieved, there is no need to lap the ring concave surface to assure satisfactory sealing because the plastic sealing lubricant injected between the ball and the ring seat will maintain the seal.

FIGURE 4 shows the second seat ring embodiment in which a seat ring 80' has its concave seating surface formed with two adjacent spherical portions 103 and 104. Surface 103 is a spherical surface which matches the normal spherical seating surface of the ball plug 24 and is located between the outer peripheral circular edge A' and an intermediate circle C. The spherical concave seat portion 104 between circle C and inner periphery circular edge B', being formed with smaller spherical radii, is offset to provide a progressive relief gap between the ring and the ball spherical seating surface.

The FIGURE 4 embodiment shows the ball plug 24 in an open position, the ball spherical seating surface in such open position being seated with an area contact on the spherical seat portion 103 of the seat ring 80'. When ball 24 is closed the spherical seating surface of the ball becomes deformed by bulging under line pressure, but the bulged portion of the ball is permitted to attain a spheroidal seating engagement with the relieved spherical concave surface 104 of the ring seat 80' to result in desired sealing cooperation.

In the second embodiment (FIGURE 4) the larger spherical portion 103 of the ring seat 80' is lapped with the ball spherical seat surface, whereas the relieved spherical surface 104 need not be lapped. Lapping of the surface 103 is preferably accomplished after the surface 104 is relieved. Alternatively, the entire ring seat concave surface could be initially lapped with the ball and then subjected to additional grinding to form the relieved spherical surface 104. This latter method will probably be limited to those valve seat rings previously made with complete normal spherical seating surfaces matching the ball spherical surfaces and which might be removed from service for reworking.

Figure 6:
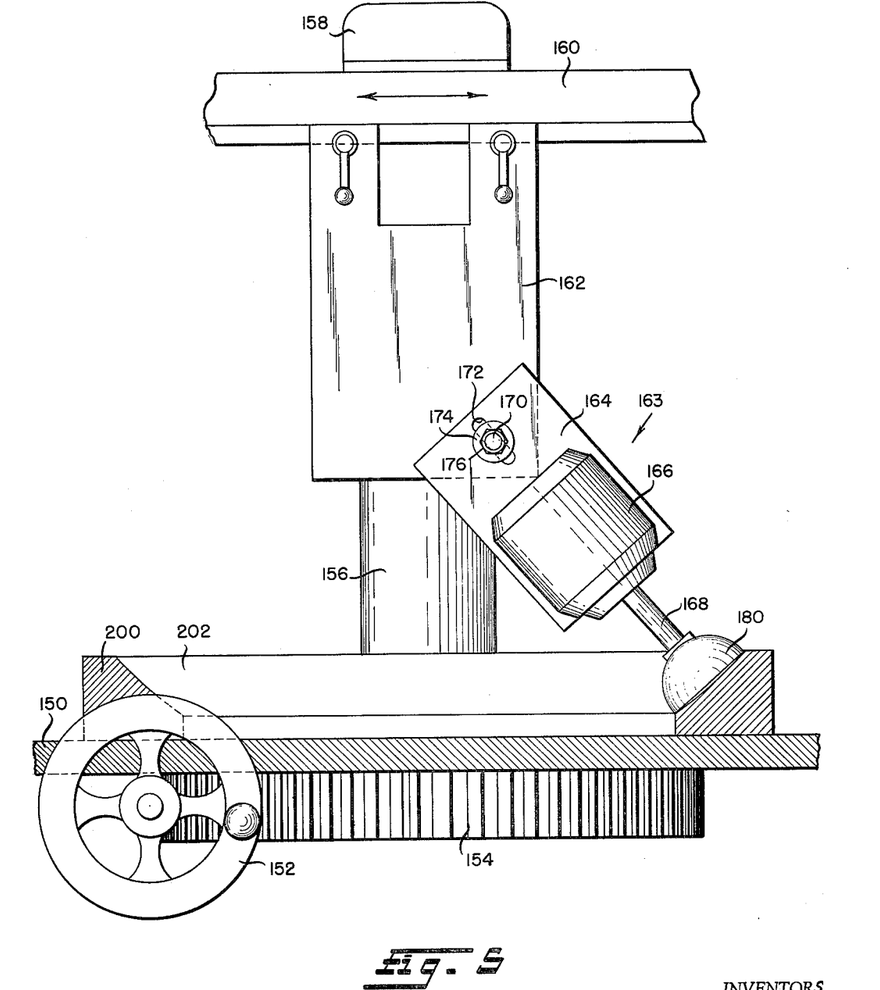
FIGURES 6, 7, 8 and 9 are skeletonized schematic views illustrate the manner in which the grinding machine is set to accomplish the offset spherical seat reliefs in spherical seat ring surface, FIGURE 6 illustrating the same machine setting as FIGURE 5 but more clearly illustrating how an original spherical seating surface the same as that of the plug will be developed, FIGURE 7 illustrating a positioning of the grinding wheel to accomplish complete spherical relief over the entire zone of the ring seat surface, FIGURE 8 illustrating a preliminary setting of the grinding wheel before positioning in the offset relationship of FIGURE 9 to accomplish partial spherical relief of the ring seat surface. Note the depicted offset of the relief in all of these figures is greatly exaggerated over the relief as will be actually utilized.
Figure 7:
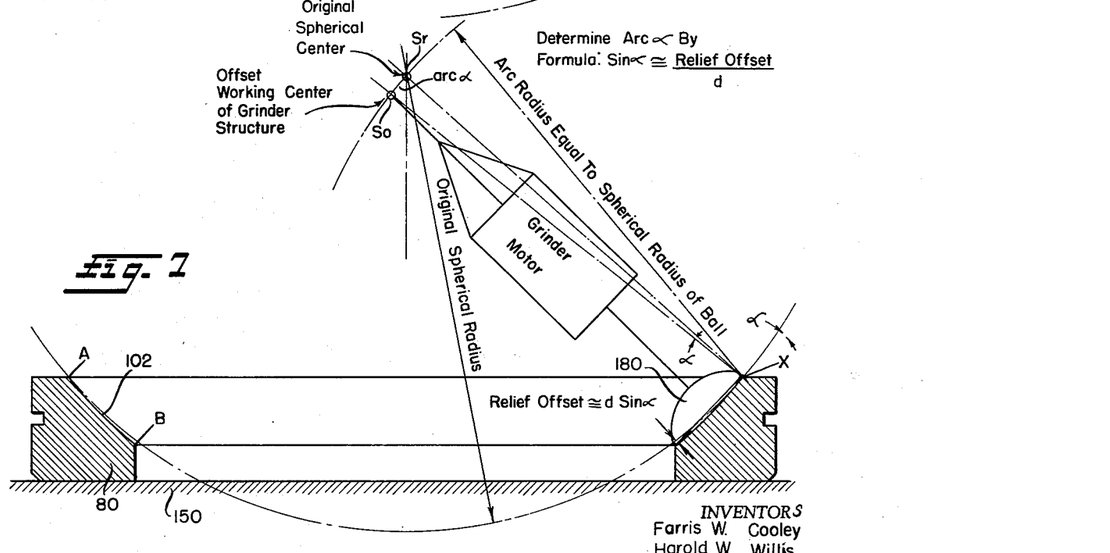
Figure 8:
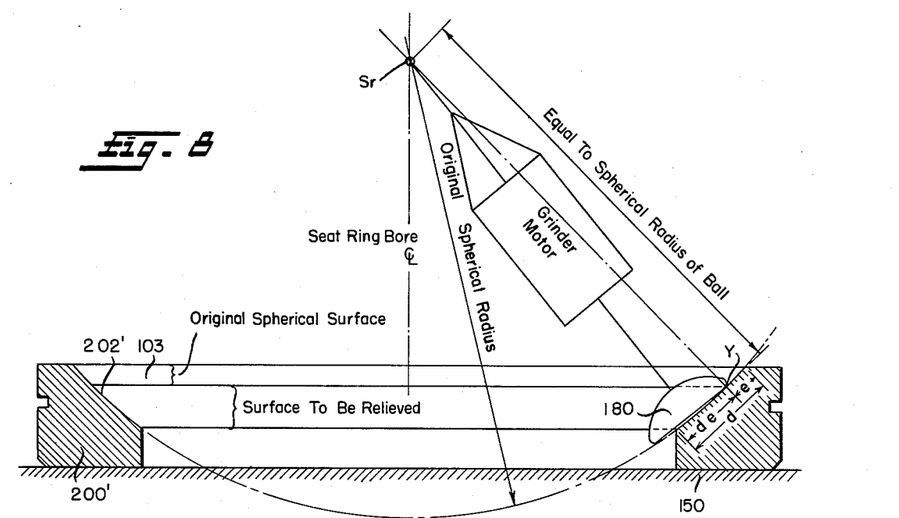
Figure 9:
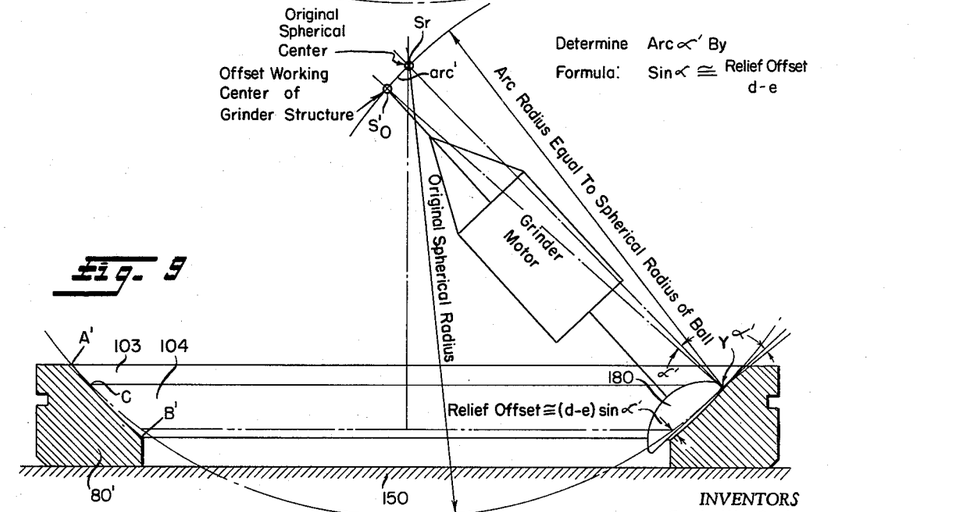

FIGURES 6 and 7 are skeleton schematic views to illustrate the geometry by which the fully relieved spherical concave ring seating surface 102 is obtained, FIGURES 8 and 9 being similar views illustrating the geometry by which the alternative form of seat ring with a partially relieved spherical concave ring seating surface 104 is obtained.

FIGURE 5 is a front elevation view, depicted somewhat schematically, to illustrate a machine tool arrangement by which the relief in the seat rings may be made. This example utilizes a rotatable table 150 upon which a seat ring 80 is rigidly clamped with its bore axis coaxial with the rotatable axis of table 150. The table can be rotated by hand wheel 152 (or a motor with suitable drive reduction) through a worm (not shown) meshing with the large worm gear 154 secured to the underside of table 150 and coaxial with the vertical axis about which the table is journalled to rotate. A vertical pylon 156 is used to support an overhead arm 158 from which is depended a track 160 parallel to the table 150 and extending across the center of the seat ring. The track could be included on the overhead arm 158. A bracket 162 depends from and is slidable horizontally along track 160. Mounted on the depending bracket 162 is grinding assembly 163 including a grinder support 164 carrying a rotary electric motor 166 with its shaft 168 lying in a vertical plane diametrically bisecting the seat ring 80. Thus, the shifting of bracket 162 along the track 160 will not result in moving the motor axis out of coincidence with the vertical diametrical plane.

The support structure 164 of the grinding assembly is secured to bracket 162 in a manner enabling an overall compound shifting which will include at least a component of horizontal shift (e.g., along track 160) and a component of vertical shift for the entire grinding assembly 163. In a simple attachment, such as depicted in FIGURE 5, such a compound shift can be managed by a single clamping stud 170 screwed into the bracket 162, an elongate slot 172 in the grinder assembly support 164 and a washer 174 and nut 176 on the stud 170 to rigidly clamp the grinding assembly in a set position. Although a production form of machine tool to grind reliefs in seat rings will be a precisely designed and constructed mechanism, basically the machine must enable the grinding assembly 163 to be mounted so its shaft axis will be disposed in a vertical plane which includes the vertical axis of rotation of the table 150 and the bore of the ring 80 secured on the table, and arranged so that the grinding assembly can be adjusted vertically and horizontally while its grinding wheel rotation axis remains in that vertical diametrical plane. Preferably, the grinder axis is maintained at 45° to the horizontal plane of the table.

Secured by conventional means on the projected end of motor shaft 168 is a cup-shaped grinding wheel 180 with a flat grinding surface, the diameter of such surface preferably being at least equal to or greater than a transverse chord line of the concave surface of a seat ring, ground to match the spherical seating surface of of a ball plug with which the seat ring is to be used. Such dimension is represented by the distance $d$ in FIGURES 6 and 8.

As will be understood, if the distance from the circumference of the flat surface of the cup-shaped grinding wheel 180 to the intersection between the vertical center line of the seat ring bore and the center line of the grinder axis is set equal to the radius of the ball plug spherical seating surface, then relative rotation, with engagement, between a seat ring and the grinding wheel (rotating on its own axis) will result in a ground concave surface on the seat ring having a spherical shape equivalent to that of the ball seating surface.

Turning now to FIGURES 6 and 7, to obtain a complete surface relief between the ring spherical seating surface and the normal spherical surface of the ball plug, a seat ring blank 200 with a pre-ground spherical seating surface 202 is clamped to rotatable table 150. Spherical surface 202 has a radius equal to that of the ball spherical radius with its center indicated at $S_r$. The grinder 163 is set so a line through its axis passes through the center $S_r$ and also so the periphery of the flat surface of the grinding wheel 180 engages and is tangent to the inner and outer edges of the ring spherical surface 202. Next, using the outer edge tangent point X (FIGURE 6) as a center point, the entire grinder assembly 163 is reset horizontally and vertically toward the table through an effective angle of $\alpha$ to theoretically relocate the original spherical radius center point at $S_0$, a point offset from the theoretical ball spherical center point $S_r$. This repositioning of the grinder assembly 163 will in effect shift the flat face of the grinding wheel 180 through a similar angle of $\alpha$ with the result that subsequent relative coaxial rotation between the seat ring blank 200 and the grinder assembly 163 on the vertical center line of the seat ring, with concurrent grinder operation, will grind a new concave spherical surface which has a smaller radius than the original spherical surface and provide a maximum relief from the original surface at the radially innermost edge B of the concave ring seat surface 102 (FIGURE 7).

The angle $\alpha$ can be calculated when the dimension $d$ is known and the desired maximum relief is known, because $$\sin \alpha \cong \frac{\text{maximum relief}}{d}$$

The symbol of approximate equality is used because the actual resultant maximum relief will be at the end of a distance slightly greater than the distance $d$ as shown in FIGURE 7. However, the small values of sin $\alpha$ with which one is working when the desired clearance is, e.g., 0.002″ will wash out any errors due to the small increase in the final dimension $d$. By appropriate geometry the necessary horizontal and vertical shifts of the grinder assembly to properly reset it can be determined.

The alternative form of relieved concave seat ring surface, that of partial relief, is shown in FIGURE 4 and FIGURES 8 and 9. This alternative relief is provided in a seat ring blank 200′ in which a spherical concave surface 202′ has already been ground and, if desired, the entire surface 202′ could be lapped. The latter would be true in reworking old rings but in providing partially relieved concave surfaces on new seat rings, economy would dictate that lapping of the non-relieved original spherical contour of the concave surface be accomplished after the relief has been ground.

The setting of the grinding machine 163 is slightly different for grinding a partial relief of the seating surface of blank 200′ than was described for the fully relieved grinding of blank 200 (FIGURES 6 and 7). Starting with the machine configuration shown in FIGURE 6, where the grinder assembly is mounted with its axis passing through the center point $S_r$ of the radii of the original spherical ring surface 202, and the radii from the circumference of the flat grinding surface to the point $S_r$ is also equal to the spherical radius, the grinder assembly 163 is effectively shifted in a clockwise direction about center point $S_r$ as viewed in FIGURE 8, so the grinding wheel periphery becomes tangent to the inner edge Y of a desired segment of spherical surface 103. Note that the distance from Y to $S_r$ (FIGURE 8) is equal to the original spherical radius. To obtain the final desired setting of the grinding assembly 163, its operative position must be reset horizontal and vertical so it undergoes an effective counterclockwise shift about point Y through an angle $\alpha'$ which places the original spherical center point of the grinder assembly at $S'_0$, an offset point which is different from that of $S_0$ in FIGURE 7. This offset of the grinder assembly will effectively shift the flat face of the grinding wheel 180 through a similar angle of $\alpha'$ and subsequent relative coaxial rotation between the seat ring 200′ and the grinder assembly on the vertical center line of the seat ring, with concurrent grinder operation, will grind a concave spherical surface 104 (FIGURE 9) of smaller radius than the radius of the original spherical surface on the radially inner part of the seat ring concave surface leaving the radially outer portion of the seat ring concave with a contour of original spherical surface 103.

The angle $\alpha'$, through which the grinding assembly 163 is to be set can be calculated when the grinder flat surface diameter $d$ is known, the chord dimension width $e$ of the desired partial surface 103 of original spherical shape is known and the maximum desired relief is known, by using the formula $$\sin \alpha' = \frac{\text{maximum relief}}{d-e}$$

Here again the symbol of approximate equality is used for the same reasons previously described, and the appropriate dimensions of horizontal and vertical reset can be readily determined.

It is to be understood that once the desired mounting of the grinding assembly 163 is determined, the support 164 can very easily be constructed to permit longitudinal traverse of the grinding assembly 163 as a whole along its shaft axis. This function is desirable in order to enable an operator to initially set the grinding assembly, and also to permit more than one series of complete grinding passes, each pass being made during a 360° rotation of the table and accomplishing a part of the desired complete relief.

It is also to be understood that the relieved ball seating surface is applicable to valves where the seat is not a loose ring but is made integral with the valve body. This latter application of the inventive concept is more particularly related to smaller sized valves, for example, spherical ball seat valves below the 12″ sizes. In such smaller valves the ball seats can be integral with the two separable valve body sections and a method of forming the spherical relieved seat surfaces equivalent to that described for the separable seat rings is used.

The foregoing description fully discloses two forms of ball valve seat rings in which the seat ring concave surface is provided with a relieved spherical surface having maximum relief at the radially innermost periphery of the seat ring concave surface, to provide for better surface seating and sealing of a spherical ball plug upon a bulging deformation of the spherical plug shape which occurs due to high line pressures when the plug is placed in its closed position. In conjunction with the new seat ring configuration, the foregoing description also discloses a novel method of making the seat ring with the relieved spherically concave seating surfaces.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A plug valve comprising: a body having inlet and outlet passages; a ported plug in said body having spherical seating surfaces; concave surfaced seats within said body at opposite sides of said plug and at respective inner ends of said inlet and outlet passages with at least a portion of the concave surface of each seat supporting said plug on its spherical seating surfaces and enabling turning movement of said plug between valve open and valve closed positions; said seats being rigid and substantially non-deformable under valve operating pressures; said plug spherical seating surface engaging a circular portion of at least the downstream seat concave surface which is situated outward in a radial sense from the major portion of said associated concave seat surface and, when there is no drop in pressure across the plug, being separated from the concave seat surface over a substantial annular area extending outward in a radial sense from and including the inner periphery of the concave seat surface.

2. A plug valve as defined in claim 1, wherein said downstream seat has a concave plug seating surface completely offset from a theoretical spherical concavity matching the normal spherical seating surface of the plug so that said separation between the seat and the plug is of progressively increasing width from substantially the radially outermost periphery of the seat concave surface to the radially innermost periphery of the seat concave surface.

3. A plug valve as defined in claim 1, wherein said downstream seat has a concave plug seating surface with at least two eccentric, coaxial and intersecting zones of distinctly different concavity, the outermost zone having a first concave surface of spherical contour matching the normal plug spherical seating surface and the innermost zone being offset from said first concave surface to provide said separation ring seat and the plug of progressively increasing width from the outermost periphery of the inner zone to the innermost periphery of the concave surface of the seat.

4. A plug valve as defined in claim 3, wherein the contours of both zones are spherical with the offset zone having the smaller spherical radius.

5. A plug valve as defined in claim 1, including lubricant groove means in said seat concave surfaces, and means for introducing lubricant under pressure through said body into said groove means.

6. In a plug valve, a body having inlet and outlet passages, a ported plug in said body having spherical seating surfaces, concave spherically surfaced seat rings within said body at opposite sides of said plug upon at least a portion of the concave surface of which said plug has its spherical seating surfaces seated for turning movement between valve open and valve closed positions, seat ring recesses in said body at the interior of said inlet and outlet passages receiving said seat rings, opposed transversely extending surfaces on each seat ring and in each of said recesses, said transversely extending surfaces being substantially parallel so that engagement between seat rings and recess will be a firm area to area engagement, at least the downstream one of said rings being rigid and substantially non-deformable under valve operating pressure, said plug spherical seating surface engaging a radially outward circular portion of at least said downstream seat ring concave surface and, when there is no drop in pressure across the plug, being separated from the concave ring seating surface of at least said downstream seat ring over a substantial annular area extending outward in a radial sense from the inner periphery of the concave ring seating surface of at least said downstream seat ring.

7. A plug valve comprising: a body having inlet and outlet passages, a ported plug in said body having spherical seating surfaces, concave surfaced seat rings within said body at opposite sides of said plug and at respective inner ends of said passages with at least a radially outer portion of the concave surface of each ring supporting said plug on its spherical seating surfaces and enabling turning movement of said plug between valve open and valve closed positions, at least the downstream one of said rings being rigid and non-deformable under valve operating pressures, said concave surface of at least the downstream seat ring having its radially innermost portion shaped with a spherical concavity of smaller spherical radius than that of the plug spherical seating surfaces and with the spherical center of the innermost portion offset downstream of the center of the plug spherical surface to provide, when there is no drop in pressure across the plug, an annular separation from the plug spherical seating surface which engages said outer portion of at least said downstream seat ring.

8. A plug valve comprising: a body having inlet and outlet passages; a ported plug in said body having spherical seating surfaces; concave surfaced seat rings within said body at opposite sides of said plug and at respective inner ends of said passages with at least a portion of the concave surface of each ring supporting said plug on its spherical seating surfaces and enabling turning movement of said plug between valve open and valve closed positions; at least the downstream one of said rings having sufficient rigidity to maintain its cross-section contour when subjected to the seating force of said plug under valve operating pressures; opposed transversely extending surfaces at least on the downstream seat ring and in said body, said transversely extending surfaces being substantially parallel; said plug spherical seating surface engaging a radially outwardly situated circular portion of at least said downstream seat ring concave surface and, when there is no drop in pressure across the plug, being separated from the concave ring seating surface over a substantial annular area extending outward in a radial sense from the inner periphery of the concave ring seating surface.

9. A ball plug valve seat ring having a back face area adapted to rest with substantially complete area to area contact against the bottom surface of a valve body seat ring recess, and a concave annular front face surface to provide a seat surface for a ball plug with spherical seating surfaces, said concave ring seating surface having at least two seating surface zones, the radially outermost of which has a spherical contour the center of which is on the axis of the ring and the contour of which is adapted to match a spherical seating surface of a ball plug with which the seat ring is to be used, and the inner zone comprising a spherical contour of smaller radius than that of said radially outermost zone of spherical contour, the center of which is on the axis of the ring and closer to the ring than is the center of the outermost spherical surface thereby providing a concavity progressively offset away from the spherical surface of the outermost zone to a maximum offset at the inner periphery of the ring seat concave seating surface, said ring having sufficient rigidity to maintain its cross-section contour when subjected to the seating force of a valve ball plug under valve operating pressure.

References Cited by the Examiner

UNITED STATES PATENTS

| | | | |
|---|---|---|---|
| 1,092,782 | 4/14 | Miles | 137—533.11 XR |
| 2,646,247 | 7/53 | Hamer | 137—246.16 |
| 2,788,015 | 4/57 | Scherer | 137—246.16 |
| 2,843,920 | 7/58 | Swartz | 29—157.1 |
| 2,869,221 | 1/59 | Siepmann | 29—157.1 |
| 2,932,311 | 4/60 | Scherer | 137—246.22 |
| 2,945,666 | 7/60 | Freeman et al. | 251—172 |
| 2,963,263 | 12/60 | Sanctuary | 251—315 XR |
| 2,989,990 | 6/61 | Boss et al. | 251—315 XR |

FOREIGN PATENTS

| | | |
|---|---|---|
| 149,684 | 1/53 | Australia. |
| 1,064,582 | 10/52 | France. |
| 1,060,206 | 6/59 | Germany. |

ISADOR WEIL, *Primary Examiner.*

UNITED STATES PATENT OFFICE
CERTIFICATE OF CORRECTION

Patent No. 3,216,696                      November 9, 1965

Farris W. Cooley et al.

It is hereby certified that error appears in the above numbered patent requiring correction and that the said Letters Patent should read as corrected below.

Column 11, line 3, after "separation" insert -- between --.

Signed and sealed this 6th day of September 1966.

(SEAL)
Attest:

ERNEST W. SWIDER                        EDWARD J. BRENNER
Attesting Officer                           Commissioner of Patents